March 8, 1932.  R. E. MUDD  1,848,538
FITTING AND COUPLING ELEMENT FOR LUBRICATING DEVICES
Filed Dec. 2, 1929
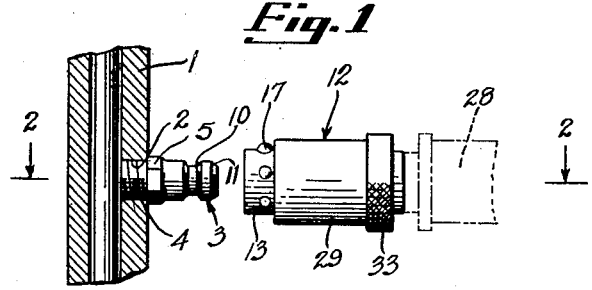
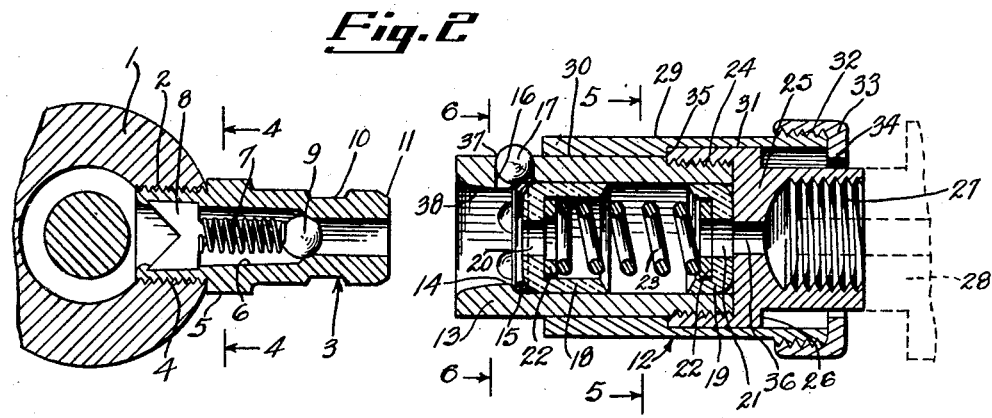
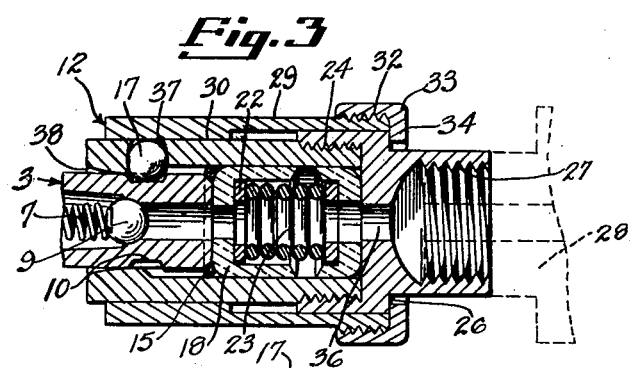
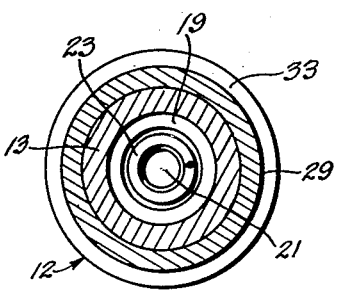
Rolla E. Mudd
INVENTOR
BY Munn Co.
ATTORNEYS Patented Mar. 8, 1932

1,848,538

UNITED STATES PATENT OFFICE

ROLLA E. MUDD, OF CHICAGO, ILLINOIS

FITTING AND COUPLING ELEMENT FOR LUBRICATING DEVICES

Application filed December 2, 1929. Serial No. 411,144.

My invention relates to improvements in fitting and coupling elements for lubricating devices, and it consists in the combinations, constructions, and arrangements herein described and claimed.

An object of my invention is to provide a fitting and coupling element for lubricating devices in which novel means is provided whereby the necessary connections for lubricating purposes may be easily and quickly made.

A further object is to provide a device of the type described in which novel means is provided whereby a rigid and positive connection may be made and in which the number of moving parts has been reduced to a minimum.

Other objects and advantages will appear in the following specification, and the novel features of the invention will be particularly pointed out in the appended claims.

My invention is illustrated in the accompanying drawings, forming part of this application, in which Figure 1 is an elevation of a construction embodying my invention, Figure 2 is an enlarged sectional view taken along the line 2—2 of Figure 1, Figure 3 is an enlarged sectional detail view of a portion of my device, Figure 4 is a sectional view taken along the line 4—4 of Figure 2, Figure 5 is a sectional view taken along the line 5—5 of Figure 2, and Figure 6 is a sectional view taken along the line 6—6 of Figure 2.

In carrying out my invention, I make use of a portion of a bearing 1 having an opening 2 therein. A fitting 3 is provided with a threaded portion 4 which is disposed within the threaded opening 2. The fitting is provided with a shoulder 5 whereby the fitting may be screwed tightly into place. Referring particularly to Figure 2, I have shown the coupling as being provided with a central bore 6 within which a compression spring 7 is positioned. One end of the spring is disposed upon a pointed portion of a wedge 8. The opposite end of the spring bears against a ball valve 9 for yieldingly holding the ball snugly against its seat. The fitting is provided with a recess 10 and a tapered end 11.

In Figure 2 I have shown the coupling element 12 in section. The coupling element comprises a cylindrical member 13 having a ridge or constricted portion 14 against which a ring 15 is arranged to bear. The cylindrical member is provided with a plurality of openings 16 within which spherical members or balls 17 are disposed. Gaskets 18 and 19 are disposed within the cylindrical member and are provided with central openings 20 and 21, respectively. A washer 22 may be associated with each of the gaskets. The gasket 18 is held in engagement with the ring 15 by means of a compression spring 23. The ends of the compression spring bear against the washers 22. The cylindrical member 13 is provided with a threaded portion 24 upon which the threaded portion of a union 25 is disposed. The union is provided with an enlarged portion whereby a shoulder 26 is attained. The reduced portion is provided with a threaded bore 27 within which the threaded portion of a hose nipple, indicated generally at 28, may be disposed. The nipple is associated with a hose, which, in turn, is associated with a compressor.

In Figure 2 I have shown a sleeve 29 as being mounted upon the cylindrical member 13 and the union 25. The sleeve is provided with an opening 30 slightly smaller in diameter than an opening 31 in the opposite end of the sleeve. The opening 30 provides a sliding fit between the sleeve and the cylindrical member 13. The sleeve is threaded as at 32 for receiving a gripping member 33. The latter is provided with a flange 34 arranged to engage the shoulder 26 when the sleeve is moved from the position shown in Figure 2 to that shown in Figure 3. The distance which the sleeve may move is determined by the shoulder 35 and the flange 34, see Figures 2 and 3. It will be noted in referring to Figure 2 that the gasket 19 bears against the union. The union is provided with an opening 36 arranged in alignment with the opening 21.

From the foregoing description of the various parts of the device, the operation thereof may be readily understood. Normally, the compression spring 23 holds the gasket 18 in the position shown in Figure 2. At this time, the ring 15 engages the balls 17, whereby the latter are held in the position shown in Figure 2. The openings 16 are slightly constricted as at 37 for preventing the balls from falling out of their respective openings. In other words, when the coupling 12 is disconnected from the fitting 3, the balls will be automatically moved to the position shown in Figure 2 by reason of the compression spring 23.

When it is desired to connect the coupling with the fitting, the coupling is disposed on the fitting. At this time the tapered end 11 will be received within the opening 38 in the cylindrical member 13. The opening is slightly tapered. The end of the fitting will engage the gasket 18 and the ring 15. These will be moved from the positions shown in Figure 2 to those shown in Figure 3 when the coupling is moved into position upon the fitting.

At this time the openings 16 are aligned with respect to the recess 10, whereby the sleeve 29 in being moved positively moves the balls 17 into the recess 10 and holds the balls therein. Thus it will be seen that the coupling element will be effectively locked upon the fitting 3. At this time a lubricating medium may be forced into the bearing 1 from a lubricating gun or compressor associated with the hose. The wedge 8 provides a minimum displacement. The sleeve 29 provides means whereby the balls are easily moved and effectively held within the recess or groove 10. The gripping portion 33 permits the sleeve to be easily moved. Merely moving the sleeve from the position shown in Figure 3 to that shown in Figure 2 will permit the coupling to be immediately detached from the fitting. Immediately upon detaching the coupling from the fitting, the compression spring 23 moves the gasket 18 and the ring 15, whereby the balls 17 are arranged in their expanded positions.

I claim:

1. In a lubricating device, the combination with a nipple having an opening therethrough and provided with a peripheral recess in the outer surface thereof, of a hollow coupling member provided with a plurality of radially disposed openings, balls movably disposed in said openings, a ring member slidably disposed within said coupling and normally positioned in engagement with the balls whereby said balls may be retained in extreme radial positions, said nipple being insertable into the coupling member and adapted for engaging said ring member whereby the ring member may be moved out of engagement with the balls and the flange portions, and a collar slidably mounted on the coupling member and adapted for engaging the balls whereby said balls may be extended into the peripheral recess of said nipple and held in their extended positions.

2. In a lubricating device, the combination with a nipple having an opening therethrough and provided with a peripheral recess in the outer surface thereof, of a hollow coupling member provided with a plurality of radially disposed openings, balls movably disposed in said openings, said coupling member being provided with internal flange portions extending between the openings, a ring member slidably disposed within said coupling and normally positioned in engagement with the flange portions and balls whereby said balls may be retained in extreme radial positions, said nipple being insertable into the coupling member and adapted for engaging said ring member whereby the ring member may be moved out of engagement with the balls and the flange portions, and a collar slidably mounted on the coupling member and adapted for engaging the balls whereby said balls may be extended into the peripheral recess of said nipple and held in their extended positions.

3. In a lubricating device, the combination with a nipple having an opening therethrough and provided with a peripheral recess in the outer surface thereof, of a hollow coupling member provided with a plurality of radially disposed openings, balls movably disposed in said openings, a ring member slidably disposed within said coupling and normally positioned in engagement with the balls whereby said balls may be retained in extreme radial positions, said nipple being insertable into the coupling member and adapted for engaging said ring member whereby the ring member may be moved out of engagement with the balls and the flange portions, and a collar slidably mounted on the coupling member and adapted for engaging the balls whereby said balls may be extended into the peripheral recess of said nipple and held in their extended positions, said collar being normally positioned out of engagement with said balls.

4. In a lubricating device, the combination with a nipple having an opening therethrough and provided with a peripheral recess in the outer surface thereof, of a hollow coupling member provided with a plurality of radially disposed openings, balls movably disposed in said openings, said coupling member being provided with internal flange portions extending between the openings, a ring member slidably disposed within said coupling and normally positioned in engagement with the flange portions and balls whereby said balls may be retained in extreme radial positions, said nipple being insertable into the coupling member and adapted for engaging said ring member whereby the ring member may be moved out of engagement with the balls and the flange portions, and a collar slidably mounted on the coupling member and adapted for engaging the balls whereby said balls may be extended into the peripheral recess of said nipple and held in their extended positions, said collar being normally positioned out of engagement with said balls.

5. In a lubricating device, the combination with a nipple having an opening therethrough and provided with a peripheral recess in the outer surface thereof, of a hollow coupling member provided with a plurality of radially disposed openings, balls movably disposed in said openings, a ring member slidably disposed within said coupling and normally positioned in engagement with the balls whereby said balls may be retained in extreme radial positions, a gasket slidably disposed within said coupling member and in continuous engagement with said ring member, spring means associated with the gasket for operatively positioning said gasket and ring member, said nipple being insertable into the coupling member and adapted for engaging said ring member whereby the ring member may be moved out of engagement with the balls and the flange portions, and a collar slidably mounted on the coupling member and adapted for engaging the balls whereby said balls may be extended into the peripheral recess of said nipple and held in their extended positions.

6. In a lubricating device, the combination with a nipple having an opening therethrough and provided with a peripheral recess in the outer surface thereof, of a hollow coupling member provided with a plurality of radially disposed openings, balls movably disposed in said openings, said coupling member being provided with internal flange portions extending between the openings, a ring member slidably disposed within said coupling and normally positioned in engagement with the flange portions and balls whereby said balls may be retained in extreme radial positions, a gasket slidably disposed within said coupling member and in continuous engagement with said ring member, spring means associated with the gasket for operatively positioning said gasket and ring member, said nipple being insertable into the coupling member and adapted for engaging said ring member whereby the ring member may be moved out of engagement with the balls and the flange portions, and a collar slidably mounted on the coupling member and adapted for engaging the balls whereby said balls may be extended into the peripheral recess of said nipple and held in their extended positions.

7. In a lubricating device, the combination with a nipple having an opening therethrough and provided with a peripheral recess in the outer surface thereof, of a hollow coupling member provided with a plurality of radially disposed openings, balls movably disposed in said openings, a ring member slidably disposed within said coupling and normally positioned in engagement with the balls whereby said balls may be retained in extreme radial positions, a gasket slidably disposed within said coupling member and in continuous engagement with said ring member, spring means associated with the gasket for operatively positioning said gasket and ring member, said nipple being insertable into the coupling member and adapted for engaging said ring member whereby the ring member may be moved out of engagement with the balls and the flange portions, and a collar slidably mounted on the coupling member and adapted for engaging the balls whereby said balls may be extended into the peripheral recess of said nipple and held in their extended positions, said collar being normally positioned out of engagement with said balls.

8. In a lubricating device, the combination with a nipple having an opening therethrough and provided with a peripheral recess in the outer surface thereof, of a hollow coupling member provided with a plurality of radially disposed openings, balls movably disposed in said openings, said coupling member being provided with internal flange portions extending between the openings, a ring member slidably disposed within said coupling and normally positioned in engagement with the flange portions and balls whereby said balls may be retained in extreme radial positions, a gasket slidably disposed within said coupling member and in continuous engagement with said ring member, spring means associated with the gasket for operatively positioning said gasket and ring member, said nipple being insertable into the coupling member and adapted for engaging said ring member whereby the ring member may be moved out of engagement with the balls and the flange portions, and a collar slidably mounted on the coupling member and adapted for engaging the balls whereby said balls may be extended into the peripheral recess of said nipple and held in their extended positions, said collar being normally positioned out of engagement with said balls.

Signed at Chicago, in the county of Cook and State of Illinois, this 27th day of November, A. D. 1929.

ROLLA E. MUDD.